United States Patent [19]

Lobastov

[11] 4,410,825

[45] Oct. 18, 1983

[54] PIEZOELECTRIC PRESSURE TRANSDUCER WITH THREADED DAMPER BAR

[76] Inventor: George S. Lobastov, 495 - 45th Ave., San Francisco, Calif. 94121

[21] Appl. No.: 253,001

[22] Filed: Apr. 10, 1981

[51] Int. Cl.³ .................................................. H01L 41/08
[52] U.S. Cl. ....................................... 310/327; 310/338
[58] Field of Search ................... 310/327, 338; 73/702, 73/703

[56] References Cited

U.S. PATENT DOCUMENTS

| 2,736,823 | 2/1956 | Sheppard et al. | 310/327 |
| 3,553,501 | 1/1971 | Thill | 310/327 |
| 3,925,692 | 12/1975 | Leschek et al. | 310/327 |
| 3,935,484 | 1/1976 | Leschek et al. | 310/327 |
| 3,979,700 | 9/1976 | Groce | 310/313 R |
| 4,316,115 | 2/1982 | Wilson et al. | 310/327 |

FOREIGN PATENT DOCUMENTS

| 198797 | 8/1967 | U.S.S.R. | 310/327 |
| 248304 | 7/1979 | U.S.S.R. | 310/327 |

*Primary Examiner*—Mark O. Budd
*Attorney, Agent, or Firm*—Limbach, Limbach & Sutton

[57] ABSTRACT

A pressure transducer is provided with a housing in which is mounted a pressure sensitive piezoelectric crystal for converting pressure changes of a rapidly moving gas to electrical signals. The crystal is mounted within the housing in a floating manner by a brass damping bar which damps extraneous acoustic oscillations. The hollow interior of the housing is filled with beeswax that surrounds the damping bar and the piezoelectric crystal, so that any parasitic oscillations arising from housing wall are damped.

6 Claims, 3 Drawing Figures

PIEZOELECTRIC PRESSURE TRANSDUCER WITH THREADED DAMPER BAR

BACKGROUND OF THE INVENTION

The present invention is directed to a pressure transducer which is utilized to record changes in pressure of gas or gaseous mixture as it advances across a defined passageway. Such pressure transducers convert mechanical inputs, such as pressure differentials, to electrical signals by means of a piezoelectric ceramic element.

Pressure transducers have had widespread use in such areas as aerodynamic installations, shock tubes, detonation tubes, pneumatic systems, and the like, where pressure gradients must be measured and recorded, as well as the velocity of the rapidly moving plasma, or gas. During such testing and operational uses, pressure changes are extreme, and a highly sophisticated and sensitive element must be provided that will measure such changes so that analysis may be made on the system.

However, it has been the case thus far, that due to the rapid changes in pressures caused by the shock wave in such uses as described, that extraneous, or parasitic, osillations act upon the sensing piezoelectric crystal so that the final measurement is distorted. Such parasitic oscillations, or vibrations, are either of the acoustic type, as during the rapid passage of the plasma past the sensing element, or parasitic oscillations that affect the actual structure of the transducer that mounts the piezoelectric crystal so that the extraneous vibrations impinging upon the housing will be transmitted to the piezoelectric crystal sensing element mounted within the housing. It is, therefore, of extreme importance to mount the piezoelectric crystal sensing element within the housing in such a way as to damp all such parasitic vibrations so only the pressure differential of the plasma or gas is measured.

SUMMARY OF THE INVEMTION

It is, therefore, the primary object of the present invention to provide a pressure transducer in which the piezoelectric crystal mounted within a housing is protected from any parasitic oscillations that derive from within the housing or from without.

To this end, the pressure transducer of the present invention is provided with a housing having a hollow interior in which is mounted the piezoelectric crystal made of lead-titanium-zirconate. The piezoelectric crystal is mounted in the housing wall via a brass damping bar which has a first end connected to the housing and a second end connected to the crystal. The crystal is grounded by a ground plate which is attached to the crystal and a grounding wire connected to the ground plate and male BNC connector mounted on the housing adjacent the brass damping bar. The hollow interior of the housing is filled with beeswax so that the piezoelectric crystal, the brass damping bar, and the ground plate are all cushioned from vibrations occurring at the housing wall surface defining the hollow interior. Thus, the damping bar damps against parasitic acoustic oscillations while the beeswax damps against vibrations stemming from the housing wall.

The pressure transducer of the present invention will weed out all extraneous oscillations so that only pressure differentials are measured. The extraneous oscillations often produced by shock waves from a detonated rapidly moving gas or plasma are, therefore, eradicated by the beeswax and brass damping bar.

BRIEF DESCRIPTION OF THE DRAWING FIGURES

The invention will be more readily understood with reference to the accompanying drawing, wherein FIG. 1 is a perspective view of the pressure transducer of the present invention;

DETAILED DESCRIPTION OF THE PREFERRED EMBODIMENT

Figure 1:
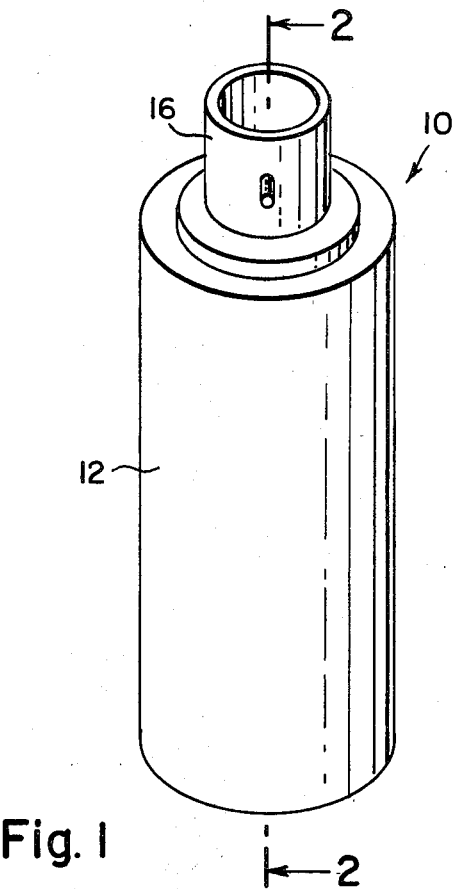
Figure 2:
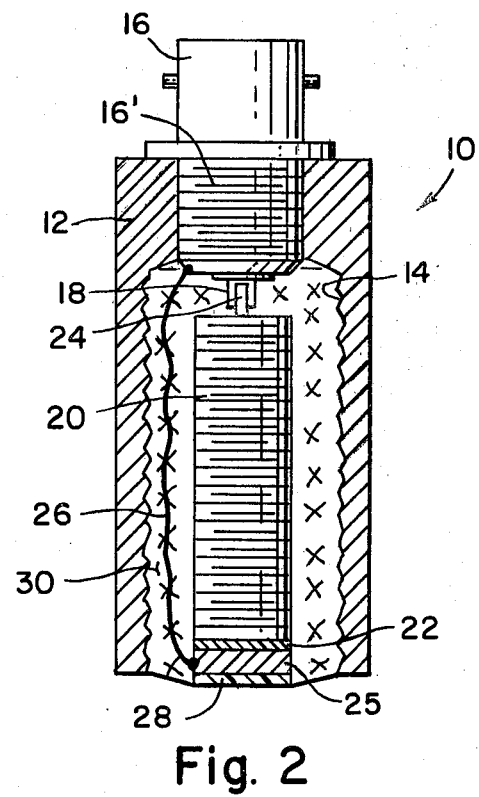
FIG. 2 is a cross-sectional view taken along line 2—2 of FIG. 1.

Referring now to the drawing, and in particular FIGS. 1 and 2, the pressure transducer of the present invention is generally indicated by reference numeral 10. The pressure transducer 10 has a housing 12 of cylindrical shape, and is typically made of brass. The elongated housing 12 defines in the interior thereof a cylindrical hollow interior 14 in which are mounted the pressure sensitive and oscillation-damping elements described below. The elongated housing 10 typically has an outer diameter of 15 mm. and an axial length of approximately 45.5 mm. It is to be understood, however, that these dimensions are only indicative of the relationship between the length and diameter of the housing, and in no way limit the invention.

A first end of the housing 10 is provided with a threaded opening in which is mounted a male BNC connector 16 of conventional design and known in the art. Male connector 16 has a threaded main body portion 16' from which extends connecting bracket 18, the bracket 18 projecting into the hollow interior 14 of the housing for electrically connecting a damping bar 20 described in detail below.

The elongated damping bar 20 is made of brass, and is preferably cylindrical in shape and threaded on the outer surface thereof. The brass damping bar 20 is typically 20 mm. in length and 8 mm. in diameter. The brass damping bar is expressly designed to mount a piezoelectric crystal 22 in a floating manner. That is, the piezoelectric crystal 22 is connected to the housing 12 only through one end of the brass damping bar 20 by a rod 24 projecting from the bar at its end adjacent the male connector 16. Rod 24 is matingly received in the bracket 18 in the conventional manner, and serves as the only point of attachment for the piezoelectric crystal to the housing 12. The cylindrical brass damping bar 20 also serves to damp all acoustic oscillations that tend to reduce the accuracy of the piezoelectric crystal and distort its readings.

The piezoelectric crystal 22 itself is mounted at the rear end of the damping bar and affixed thereto, as by Wood's alloy which has a melting temperature of 80 degrees Celsious. The piezoelectric crystal 22 is typically 8 mm. in diameter and made of lead-titanium-zirconate.

Affixed to the other face of the piezoelectric crystal 22 is a ground plate 25 which is grounded to the male connector's main body portion 16' by a copper wire 26. An epoxy resin cover 28 is affixed to the other side of the ground plate remote from the piezoelectric crystal. The ground plate, epoxy resin cover and piezoelectric crystal are also adhered to each other by, for example, Wood's alloy.

The annular space between the elements 20, 22, 25 and 28 and the annular wall of the housing 10 is filled with beeswax which serves to damp oscillations emanating from the housing wall itself. Such beeswax is shown represented in FIG. 2 by reference 30. Thus, it is seen that two damping means are provided. The first, which is the damping bar 20, eliminates acoustic oscillations, while the second, the beeswax filler, eliminates extraneous oscillations deriving from the housing wall, which would occur from some extraneous source. The damping bar 20, as mentioned above, is threaded on its outer surface to increase the damping effects on parasitic acoustic oscillations.

Figure 3:
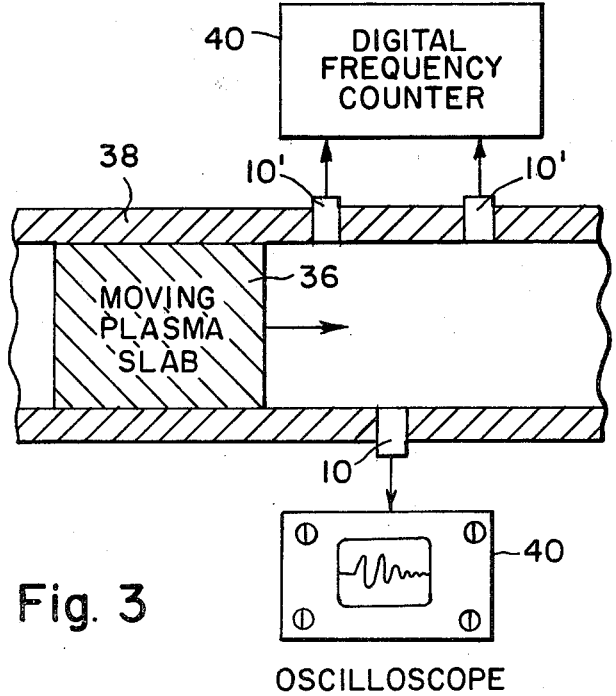
FIG. 3 is a diagrammatic view of a typical system utilizing the pressure transducer of the present invention.

The pressure transducer of the present invention is used to measure fast pressure changes in gases, as in shock tubes and detonation tubes. Such a system is shown in FIG. 3, where the pressure transducers of the present invention are mounted along the path of a moving plasma slab indicated generally by reference numeral 36 moving within a shock tube 38. Pressure transducers 10' mounted on one side of the moving plasma are electrically connected to a digital frequency counter 40 which will measure the velocity of the shock wave. Since the shock wave will, in most cases, cause parasitic acoustic oscillations, the damping bar 20 of the present invention will filter and damp these oscillations so only the pressure change of the shock wave is recorded. The pressure transducer 10 shown in FIG. 3 mounted on the other side of the pressure transducers 10' and in the center thereof, will measure the fast pressure change of the shock wave itself when connected to an electronic oscilloscope 40.

The pressure transducer of the present invention has an operating temperature range of 0 degrees Celsius to 40 degrees Celsious, and an operating pressure range of amplitudes of 0.2 millibar to 10 bar for time varying loads of 0.1 Hertz to 100 Kilohertz.

Typical dimensions are: 1.0 mm. thickness for the piezoelectric crystal 22; 4.0 mm. thickness for the ground plate 24; and 2.5 mm. thickness for the epoxy resin cover 28.

While a specific embodiment of the invention has been shown and described, it is to be understood that numerous changes and modifications may be made therein without departing from the scope and spirit of the invention as defined and limited in the appended claims.

What is claimed is:

1. A pressure transducer comprising:
   an elongated hollow housing having an open front end and a rear end;
   electrical connector means mounted to said rear end of said housing;
   an elongated damping bar mounted at one end thereof to said connector means, said damping bar being disposed within and spaced away from the interior surface of said housing, said damping bar being threaded on the outer surface thereof;
   a piezoelectric crystal mounted to the free end of said damping bar in a manner to be spaced away from the interior surface of said housing; and
   a filler material disposed within said housing, surrounding said damping bar and said crystal, said filler material functioning to support said damping bar and crystal in spaced relationship to said housing whereby said threaded damping bar and said filler material cooperate to inhibit the transmission of spurious oscillations imparted to said housing directly to said crystal.

2. A pressure transducer as recited in claim 1 wherein said filler material comprises beeswax.

3. A pressure transducer as recited in claim 1 wherein said damping bar is electrically conductive.

4. A pressure transducer as recited in claim 3 further including a means for grounding said crystal.

5. A pressure transducer as recited in claim 4 wherein said ground means includes a ground plate mounted to the free end of said crystal, said ground means further including a wire means electrically connecting said ground plate to said electrical connector means.

6. A pressure transducer as recited in claim 5 further including cover plate formed from an epoxy resin material and connected to the free end of said ground plate.

* * * * *